Figure 4:
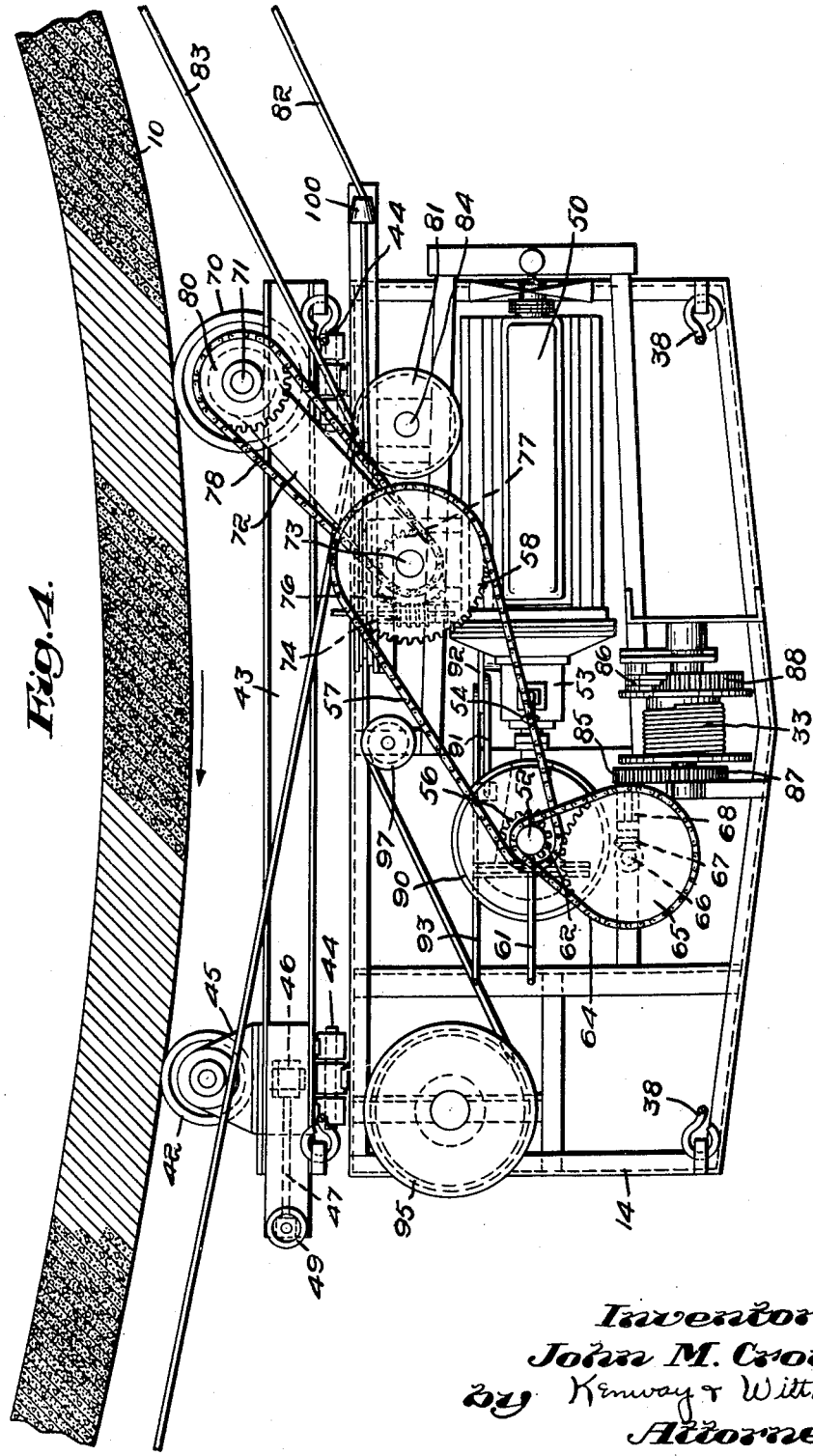

Dec. 12, 1944.  J. M. CROM  2,364,696
METHOD OF AND APPARATUS FOR BANDING TANKS
Filed Feb. 2, 1944  4 Sheets-Sheet 1
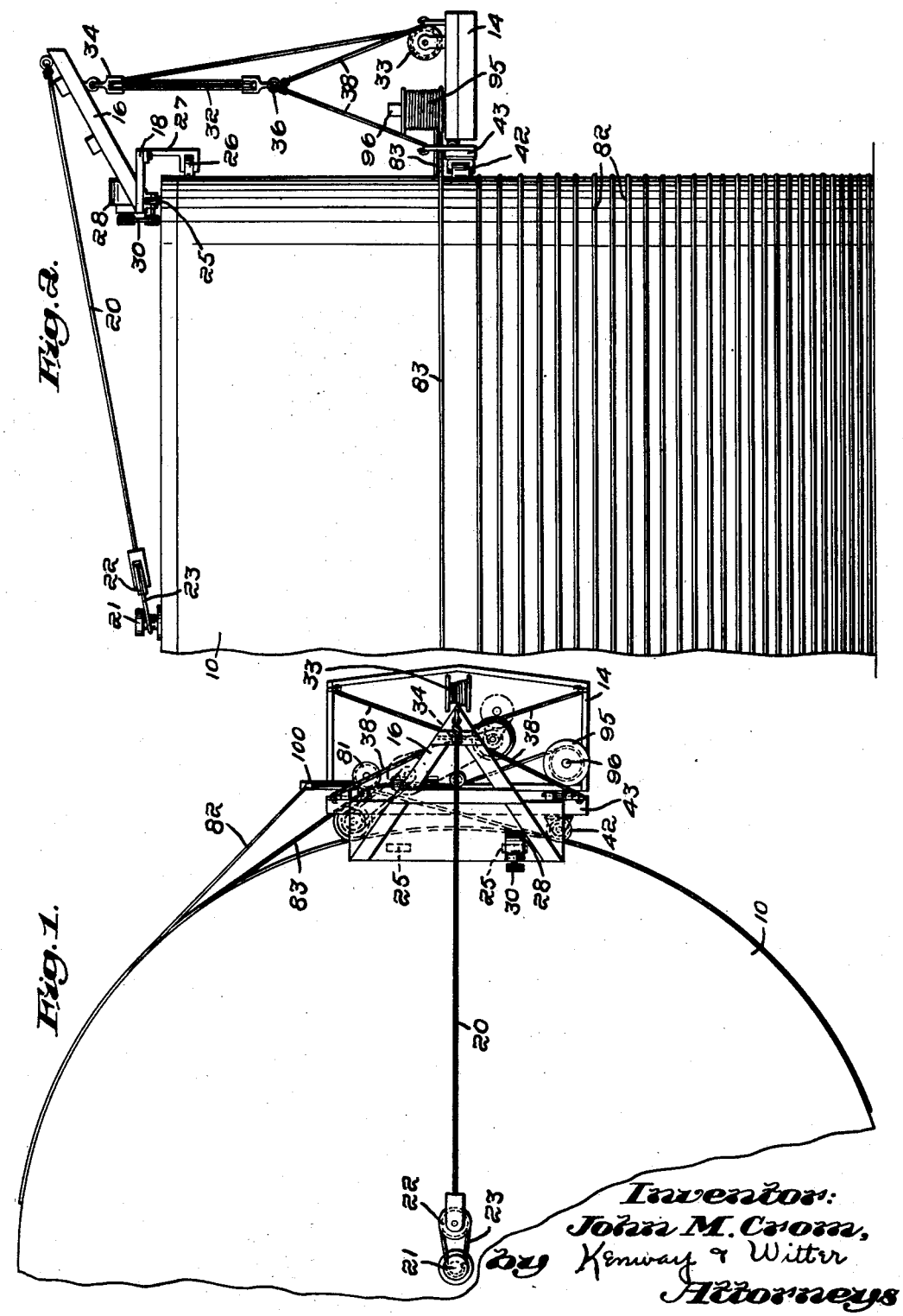
Inventor:
John M. Crom,
by Kenway & Witter
Attorneys Dec. 12, 1944. J. M. CROM 2,364,696
METHOD OF AND APPARATUS FOR BANDING TANKS
Filed Feb. 2, 1944 4 Sheets-Sheet 2
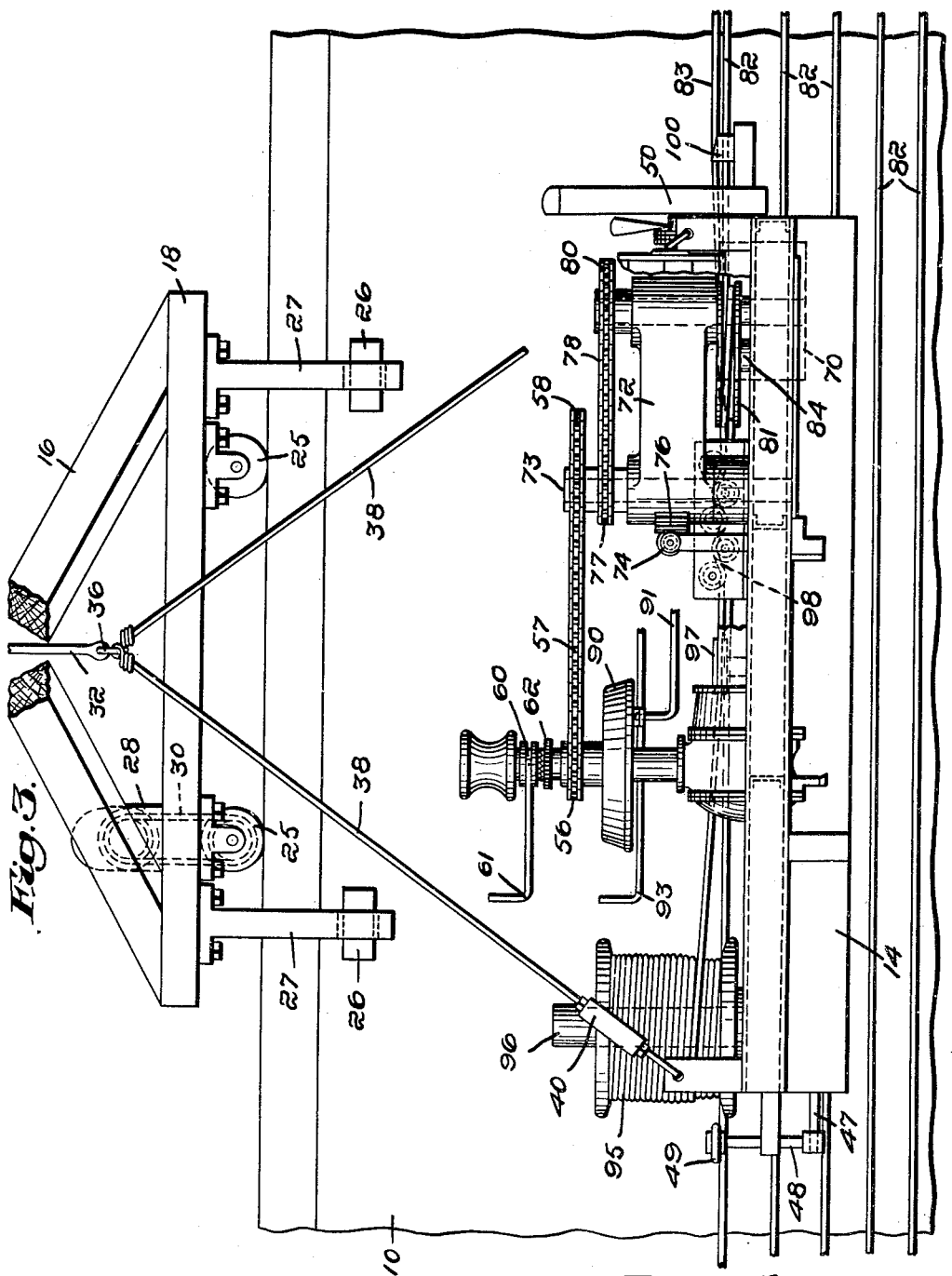

Dec. 12, 1944.   J. M. CROM   2,364,696
METHOD OF AND APPARATUS FOR BANDING TANKS
Filed Feb. 2, 1944   4 Sheets-Sheet 3

Inventor:
John M. Crom,
by Kenway & Witter
Attorneys

Dec. 12, 1944.   J. M. CROM   2,364,696
METHOD OF AND APPARATUS FOR BANDING TANKS
Filed Feb. 2, 1944   4 Sheets-Sheet 4
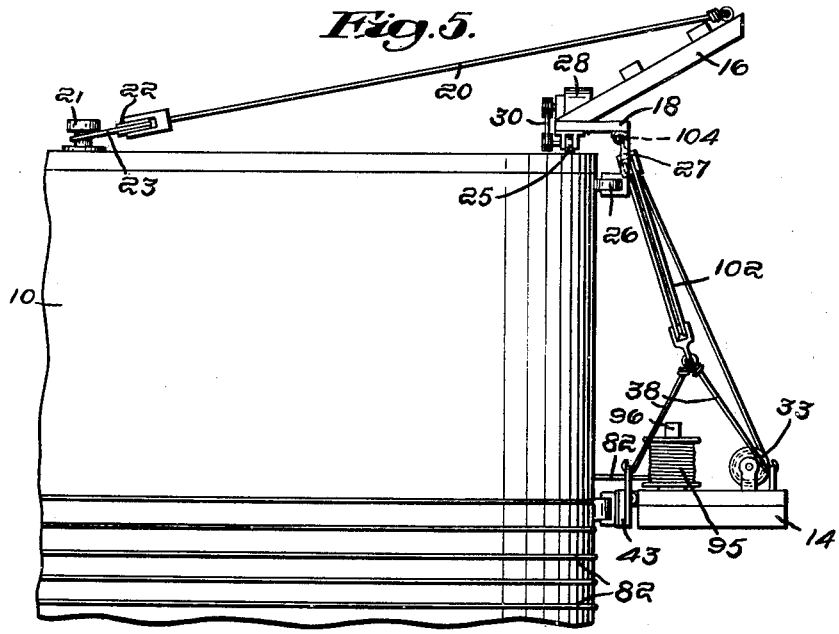
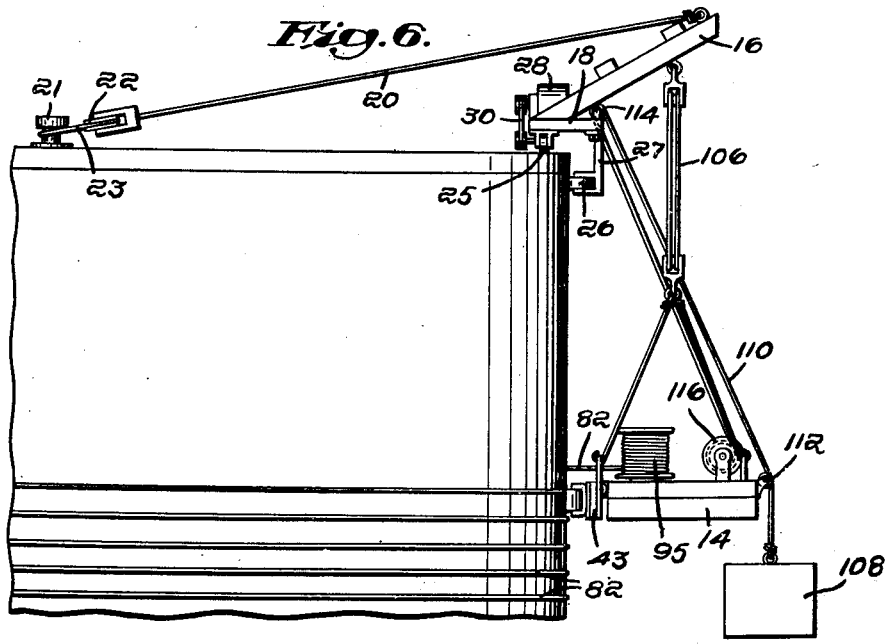
Inventor:
John M. Crom,
by Kenway & Witter
Attorneys Patented Dec. 12, 1944

2,364,696

UNITED STATES PATENT OFFICE 2,364,696

METHOD OF AND APPARATUS FOR BANDING TANKS

John Maurice Crom, Washington, D. C.

Application February 2, 1944, Serial No. 520,770

13 Claims. (Cl. 242—7)

This invention relates to certain improvements in and to my prior copending application Serial No. 464,508 filed November 4, 1942 for a novel method and apparatus for banding tanks with wire reinforcement. My said prior application discloses the employment of a wire carrying and placing vehicle supported for movement around and adjacent to the outer face of the tank to be banded. An end of the wire reinforcement is anchored at a starting point adjacent to the base or top of the tank and the vehicle carries the free portion thereof and winds it into taut contact with the tank as the vehicle proceeds therearound. The vehicle is movable horizontally and circumferentially around the tank and means is provided for trailing the wire tightly onto the tank and placing the succeeding convolutions progressively higher or lower and in predetermined proximity.

Whereas the mechanism illustrated in my said prior application effects the banding movement of the vehicle by pulling the vehicle by and along a cable extending around and in frictional contact with the tank, my present invention proposes to drive the vehicle by direct traction contact of a driving wheel thereof with the side wall of the tank, means being provided for holding the driving wheel in pressure driving contact with the tank wall. A primary object of the invention resides in the production of a novel and improved method and apparatus for banding tanks in this manner.

The invention contemplates the adjustable mounting of one or more traction driving wheels on the vehicle, and preferably on a pivoted arm, in such position that the wheel can be brought into predetermined pressure driving contact with the tank, together with cooperating means for maintaining traction by holding the vehicle against movement in a direction away from the tank. This means can be in the nature of an anchorage to the tank or the function can be effected otherwise as by the action of gravity against the vehicle. The latter can be effected through the action of gravity either on the vehicle itself or on a weight supported in position to act against the vehicle. The production of such novel method and apparatus for the purpose described comprises a further object of the invention.

These and other features of the invention will be best understood and appreciated from the following description of a preferred embodiment thereof selected for purposes of illustration and shown in the accompanying drawings in which, Fig. 1 is a fragmentary plan view of a tank being banded in accordance with my invention, Fig. 2 is a fragmentary side elevation thereof, Fig. 3 is an enlarged and fragmentary front elevation of the banding mechanism, Fig. 4 is a plan view thereof, Fig. 5 is a fragmentary side elevation of a modified construction, and Fig. 6 is a like view of a further modified construction.

In the drawings, 10 indicates the cylindrical side wall of a concrete tank. My improved method and apparatus are herein illustrated and described in connection with the banding of this tank with steel wire wound circumferentially around and into tensioned contact with the side wall whereby placing the tank in predetermined compression. The banding is effected through the employment of a vehicle illustrated as suspended from the top of the tank in such manner as to travel around the tank, adjacent to and in contact with the side wall being banded, and trail the banding wire therefrom and into predetermined tensioned contact with the tank.

As illustrated, 14 indicates a vehicle or platform suspended from a boom 16 to a position overhanging the outer face of the side wall 10. The boom is supported on a carriage 18 in rolling contact with the top of the tank and anchored by a cable 20 for swiveling movement about a fixed post 21 at the central vertical axis of the tank, the cable being connected to a pulley 22 engaging an endless band 23 looped around the post. The carriage 18 is supported on wheels 25 resting on the top of the tank and rotatable on horizontal axes and also by wheels 26 carried on brackets 27, the wheels 26 being rotatable on vertical axes and in contact with the side wall 10. The carriage is adapted to be driven by a motor 28 through a belt 30 to one of the wheels 25, as more particularly described in my said copending application.

The vehicle or platform 14 is suspended from the boom 16 by means of a cable 32 wound on a drum 33 on the vehicle and extending over a sheave 34 supported on the boom. The free end of the cable carries a ring 36 to which is connected four cables having their lower ends secured to the four corners of the vehicle, turnbuckles 40 being provided to level the vehicle. The vehicle is provided with a front wheel 42 rotatable on a vertical axis and arranged to engage the side wall 10 and provide rolling contact with the side wall in the direction of travel around the tank. The wheel support is carried by a beam 43 pivotally connected to the vehicle on horizontal axes at 44 whereby permitting the wheel to adjust itself into flat contact with the side wall. The vehicle travels in the direction indicated by the arrow in Fig. 4 and the front wheel 42 is mounted in a yoke 45 adjustable on a stud 46. An arm 47 fixed to the stud has its outer end engaged by a screw 48 carrying a hand wheel 49 by which the yoke and wheel can be adjusted to guide and steer the vehicle along the desired path.

An engine 50 mounted on the vehicle is arranged (1) to drive the vehicle around the tank and (2) to elevate and lower the vehicle. The engine shaft is operatively connected to a vertical shaft 52 through transmission gearing 53 controlled by a gear shifting lever 54. A sprocket 56 fixed to the shaft 52 is operatively connected by a chain 57 to a large sprocket wheel 58 and a sprocket 62 loose on the shaft 52 is operatively connected by a chain 64 to a large sprocket wheel 65 on a shaft 66. A clutch 60 splined to the shaft 52 is adapted to be shifted by a lever 61 into and out of engagement with the sprocket 62.

The chain 57 is adapted to drive the vehicle around the tank through the employment of a traction wheel 70 and the following mechanism. The traction wheel is fixed to a shaft 71 on the free end of an arm 72 pivotally mounted on a vertical post 73 carried by the vehicle. The arm can be adjusted about the post as an axis through the rotation of a worm 74 mounted in bearings in the vehicle and in mesh with a worm segment 76 integral with the arm. The sprocket wheel 58 is fixed to a smaller sprocket 77 and both are rotatably mountetd on the post 73. A drive chain 78 connects the sprocket 77 with a sprocket 80 fixed to the shaft 71. It will be apparent that rotation of the worm in one direction is adapted to swing the arm toward the tank and move the driving wheel 70 into contact with the side wall 10 and that the driving wheel is adapted to be driven from the engine 50 through the connections described.

The vehicle is driven in the direction indicated by the arrow and trails the banding wire 82 into tight contact with the tank in the manner described. It will be apparent that the driving of the vehicle for this purpose requires a considerable traction engagement of the driving wheel 70 against the tank and, while the weight of the vehicle together with the adjustment provided by the worm 74 may be sufficient in some instances, it is desirable to provide auxiliary means for holding the driving wheel in firm frictional contact. This means, as illustrated in Figs. 1–4 of the drawings, comprises an endless annular cable 83 extending horizontally around and in contact with the tank and around an idler sheave 81 rotatable on a vertical post 84 fixed to the vehicle. This cable permits free travelling movement of the vehicle and serves to limit outward movement thereof away from the tank when adjusting the driving wheel into frictional contact with the wall 10.

The chain 64 is adapted to rotate the drum 33 when the clutch 60 is engaged with the sprocket 62. The shaft 66 is connected by bevel gears 67, to a shaft 68 having a pinion 85 thereon in mesh with a gear 87 on the drum shaft. Retrograde rotation of the drum 33 is prevented by pawls 86 engaging the teeth of a ratchet wheel 88 fixed to the drum.

A brake drum 90 is fixed to the shaft 52 and an interlocking connection including a rod 91 is provided between the clutch lever 92 and the brake shoes cooperating with the drum. The clutch mechanism is operated by a hand rod 93. When the clutch is in closed position the brake shoes are disengaged through the rod 91 and when the clutch is moved to open position the shoes are automatically engaged with the drum through the same connection. Thus when the shaft 52 is disengaged from the engine shaft the brake automatically prevents rotation of the shaft 52.

The wire 82 to be banded onto the tank is drawn from a roll 95 on a vertical post 96 carried by the vehicle. The wire passes from the roll to a guiding sheave 97 and preferably through a gang of sheaves 98 engaging opposite sides of the wire and serving to guide and somewhat tension the wire as it is drawn from the roll. The wire continues therefrom through a resistance member 100 having a wire receiving hole therethrough of a size causing the member tightly to grip the wire and hold it in a predetermined tension determined by the size of the hole in relation to the size of the wire. From thence the wire passes into banding contact with the outer face of the tank wall 10.

It will be apparent that the cable annulus 83 serves to limit outward movement of the vehicle when the arm 72 is moved in a direction pressing the driving wheel 70 into contact with the tank and, while I prefer so adjustably to mount the driving wheel that it can be moved toward the tank relative to the vehicle, I desire it to be understood that the driving wheel can be mounted directly on the vehicle and the cable 83 drawn sufficiently tight, as by providing an adjustment for the post 84, to hold the wheel in driving contact with the tank. I desire it also to be understood that other means, as for example the action of gravity, can be employed for resisting outward movement of the vehicle and for holding the driving wheel in traction contact with the tank. Two such means acting through the effect of gravity are illustrated in Figs. 5 and 6 and will now be described.

In Fig. 5 the vehicle 14 is hung from the carriage 18 at such an angle that the effect of gravity thereon serves to hold the vehicle and its driving wheel in contact with the tank. The vehicle 14 is supported by a cable 102 hung from the carriage 18 from a point 104 closely adjacent to the tank from which it will be apparent the vehicle tends to swing inwardly. In this construction the driving wheel 70 can be mounted directly on the vehicle or on an adjustable member such as the arm 72.

In Fig. 6 the vehicle is hung from the carriage 18 by a substantially vertical cable 106 in the manner illustrated in Figs. 1–4, and a weight 108 together with a cable 110 are so associated therewith as to press the vehicle inwardly toward the tank through the action of gravity on the weight. One end of the cable is attached to the weight and extends upwardly therefrom over a sheave 112 fixed to the outer edge of the vehicle. The cable continues upwardly and over a supporting sheave 114 on the carriage 18 and located closely adjacent to the tank, and from thence downwardly and onto a drum 116 on the vehicle 14. The weight can be elevated and lowered by rotating the drum and it serves at all times to press the sheave 112 and the vehicle inwardly toward the tank.

Having thus described my invention what I claim as new and desire to secure by Letters Patent of the United States is:

1. A method of banding a tank circumferentially with continuous wire reinforcement, which consists in holding a traction driven wheeled vehicle in traction driving contact with and driving it thereby around the outer vertical face of the tank, and trailing wire reinforcement from the vehicle in tight contact with the tank as the vehicle passes therearound.

2. A method of banding a tank circumferentially with continuous wire reinforcement, which consists in supporting a traction driven wheeled vehicle in position adjacent to the outer side face of the tank, holding a driving wheel of the vehicle in traction driving contact with said face and increasing the traction pressure of the wheel against said face relative to the vehicle while resisting outward movement of the vehicle away from said face, driving the vehicle around the tank through said contact, and trailing wire reinforcement from the vehicle in tight contact with the tank as the vehicle passes therearound.

3. A method of banding a tank circumferentially with continuous wire reinforcement, which consists in holding a traction driven wheeled vehicle in traction driving contact with the outer vertical face of the tank by means of an endless cable extending horizontally around the tank and looped over a portion of the vehicle, driving the vehicle horizontally around the tank through such contact, and trailing wire reinforcement from the vehicle in tight contact with the tank as the vehicle passes therearound.

4. A method of banding a tank circumferentially with continuous wire reinforcement, which consists in so suspending a traction driven wheeled vehicle from the top of the tank to a position adjacent to the outer side face of the tank that through the action of gravity thereon the vehicle rests in traction driving contact with said face, driving the vehicle around the tank through said contact, and trailing wire reinforcement from the vehicle in tight contact with the tank as the vehicle passes therearound.

5. A method of banding a bank circumferentially with continuous wire reinforcement, which consists in supporting a traction driven wheeled vehicle in position adjacent to the outer side face of the tank, holding the driving wheel of the vehicle in traction driving contact with said face by bringing the action of gravity on means exterior of the vehicle to bear against said wheel in the direction of said face, driving the vehicle around the tank through said contact, and trailing wire reinforcement from the vehicle in tight contact with the tank as the vehicle passes therearound.

6. Apparatus for banding a tank circumferentially with continuous wire reinforcement, comprising a traction driven wheeled vehicle mounted for movement around the tank adjacent to its outer face, means for holding a driving wheel of the vehicle in traction driving contact with said face, an engine on the vehicle, driving connections from the engine to said wheel for moving the vehicle around the tank, and means on the vehicle for trailing wire reinforcement therefrom into tight contact with the tank as the vehicle passes therearound.

7. Apparatus for banding a tank circumferentially with continuous wire reinforcement, comprising a traction driven wheeled vehicle mounted for movement around the tank adjacent to it outer face, means on the vehicle for supporting and moving a driving wheel of the vehicle toward and into traction contact with said face relative to the vehicle, an engine on the vehicle, driving connections from the engine to said wheel for moving the vehicle around the tank, and means on the vehicle for trailing wire reinforcement therefrom into tight contact with the tank as the vehicle passes therearound.

8. The apparatus defined in claim 7 plus means acting laterally inward against the vehicle and resisting movement thereof in a direction outwardly of said face.

9. Apparatus for banding a tank circumferentially with continuous wire reinforcement, comprising a traction driven wheeled vehicle mounted for movement around the tank adjacent to its outer face, an arm supported on the vehicle for pivotal movement about a vertical axis, a driving wheel carried by the arm remote from the axis, means for adjusting the arm about the axis in a direction to bring the wheel into traction contact with said face, an engine on the vehicle, driving connections from the engine to said wheel for moving the vehicle around the tank, and means on the vehicle for trailing wire reinforcement therefrom into tight contact with the tank as the vehicle passes therearound.

10. Apparatus for banding a tank circumferentially with continuous wire reinforcement, comprising a traction driven wheeled vehicle mounted for movement around the tank adjacent to and in contact with its outer face, an annulus extending around and in contact with the tank and over a sheave on the vehicle for holding the vehicle in traction driving contact with the tank, an engine on the vehicle, means driven by the engine for moving the vehicle around the tank through such contact, and means on the vehicle for trailing wire reinforcement therefrom into tight contact with the tank as the vehicle passes therearound.

11. The apparatus defined in claim 10 plus adjustable means on the vehicle for increasing the traction driving contact pressure of the vehicle against said face.

12. Apparatus for banding a tank circumferentially with continuous wire reinforcement, comprising a traction driven wheeled vehicle adapted to ride on and around the outer vertical face of the side wall of a tank, a second wheeled vehicle in rolling contact with the top of the tank above the first vehicle, a cable suspending the first vehicle from the second vehicle at such angle that a driving wheel of the first vehicle rests by gravity in traction contact with said face, an engine on the first vehicle, driving connections from the engine to said wheel for moving the first vehicle around the tank, and means on the first vehicle for trailing wire reinforcement therefrom into tight contact with the tank as the first vehicle passes therearound.

13. Apparatus for banding a tank circumferentially with continuous wire reinforcement, comprising a traction driven wheeled vehicle mounted for movement around the tank adjacent to its outer face and having a driving wheel adapted to rest in driving contact with said face, means including a counterweight and cable arranged to press and hold the driving wheel in traction driving contact with said face, an engine on the vehicle, driving connections from the engine to said wheel for moving the vehicle around the tank, and means on the vehicle for trailing wire reinforcement therefrom into tight contact with the tank as the vehicle passes therearound.

JOHN MAURICE CROM.